United States Patent [19]

McGinn

[11] Patent Number: 5,272,531
[45] Date of Patent: Dec. 21, 1993

[54] AUTOMATIC GAIN CONTROL SYSTEM FOR USE IN POSITIVE MODULATION WHICH DETECTS THE PEAK WHITE VOLTAGE LEVEL SLOWLY WHILE SIMULTANEOUSLY ADJUSTING BLACK VOLTAGE LEVEL FLUCTUATIONS QUICKLY

[75] Inventor: Michael McGinn, Scottsdale, Ariz.
[73] Assignee: Motorola, Inc., Schaumburg, Ill.
[21] Appl. No.: 986,391
[22] Filed: Dec. 7, 1992
[51] Int. Cl.$^5$ .................. H04N 5/52; H04N 5/10
[52] U.S. Cl. .................. 358/154; 358/174; 358/171; 358/156
[58] Field of Search ............. 358/154, 155, 156, 157, 358/171, 172, 174, 177, 178, 179, 188

[56] References Cited

U.S. PATENT DOCUMENTS

| | | | |
|---|---|---|---|
| 2,651,675 | 9/1953 | Wissel | 358/177 |
| 2,950,343 | 8/1960 | Goodrich | 358/154 |
| 3,182,123 | 5/1965 | Kao | 358/157 |
| 3,558,816 | 1/1971 | Wise | 358/172 |
| 4,234,892 | 11/1980 | Mochizuki et al. | 358/178 |

*Primary Examiner*—James J. Groody
*Assistant Examiner*—Cheryl Cohen
*Attorney, Agent, or Firm*—Bradley J. Botsch, Sr.

[57] ABSTRACT

An AGC system for use in positive modulation schemes of video signals is provided. The AGC system utilizes an IF amplifier, a demodulator, a video amplifier, a gated amplifier and a peak detector. The gated amplifier has a first, relatively fast, time constant associated therewith. The gated amplifier, which is activated during the time interval that the black voltage appears on the video signal, is responsive to an intial reference voltage and to the video signal for providing an output signal to control the gain of the IF amplifier. The peak detector has a second, relatively slow, time constant associated therewith. The peak detector is used to detect the peak white voltage level of the video signal to adjust the initial reference voltage to account for fluctuations and errors in the peak white voltage level.

4 Claims, 1 Drawing Sheet

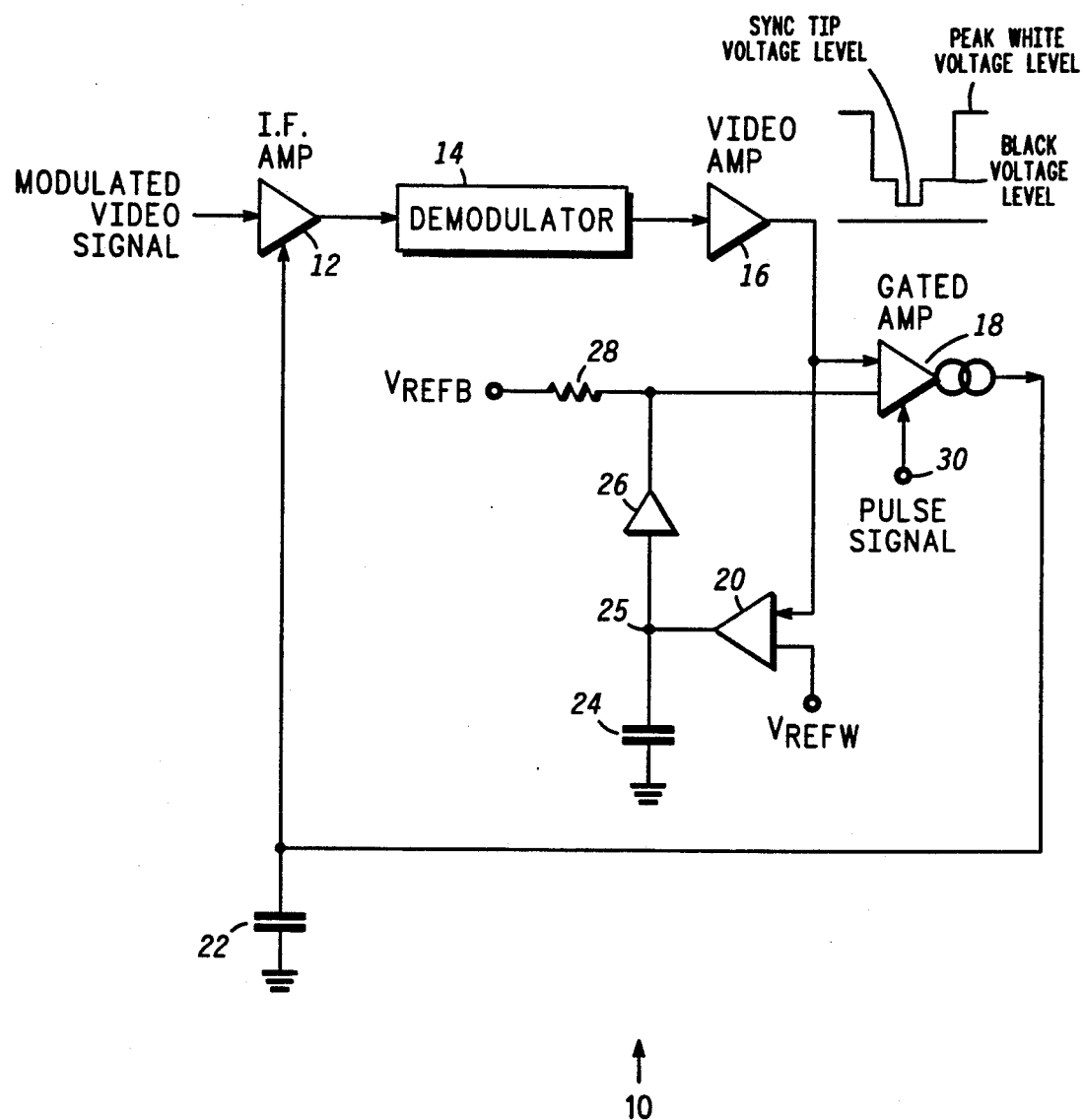

AUTOMATIC GAIN CONTROL SYSTEM FOR USE IN POSITIVE MODULATION WHICH DETECTS THE PEAK WHITE VOLTAGE LEVEL SLOWLY WHILE SIMULTANEOUSLY ADJUSTING BLACK VOLTAGE LEVEL FLUCTUATIONS QUICKLY

FIELD OF THE INVENTION

This invention relates to automatic gain control circuits and, in particular, to a circuit for use in automatic gain control systems utilizing positive modulation of television intermediate frequency signals.

BACKGROUND OF THE INVENTION

A video signal includes at least three levels of voltages; the sync tip voltage level, the black voltage level and the peak white voltage level. For the case of positive modulation schemes, the sync tip voltage level is approximately 10% of the full scale carrier voltage level, the black voltage level is approximately 30% the full scale carrier voltage level, and the peak white voltage level is at 100% the full scale carrier voltage level.

A modulated video signal is received via a demodulation circuit which comprises an intermediate frequency (IF) amplifier, a demodulator and a peak detector for controlling the gain of the IF amplifier. The IF amplifier has its input coupled to receive, via a tuner, the modulated video signal. The demodulator takes the modulated video signal at the output of the IF amplifier and outputs the video signal. This video signal is then sent into a first input of a peak detector wherein the second input of the peak detector is coupled to receive a reference voltage level. The peak detector functions to detect a peak voltage on the video signal and adjust the gain of the IF amplifier to ensure that the peak white voltage level is maintained at a predetermined level.

When a negative modulation scheme is utilized, a relatively fast acting peak detector or gated automatic gain control system can be used to monitor and control the demodulated sync tip level because the sync tip level for negative modulation is at 100% of the full scale carrier level. However, such an approach cannot be used when a positive modulation scheme is utilized because even if the black voltage level, which is at 30% of the full scale carrier level is controlled in a predetermined fashion, a small error in the black voltage level at the transmitter (which is common for systems in France) translates into a substantially large error in the peak white voltage level. As a result, automatic gain control circuits for positive modulation TV signals use the peak detector to detect the peak white voltage level of the video signal. Thus, a second input of the peak detector is coupled to receive a peak white reference voltage level. However, a long time constant must be used with respect to the peak detector because the video signal may only be at a peak white voltage level for a short period of time during the picture. As a result, the AGC system is slow and cannot track signal fluctuations very well. Further, the TV picture may go blank for a substantial number of seconds upon changing channels.

Hence, there exists a need for an improved automatic gain control system for use in positive modulation schemes for video signals.

BRIEF DESCRIPTION OF THE DRAWING

Referring to the sole FIGURE, a detailed schematic/block diagram of an automatic gain control system for detecting a peak white voltage level for positive modulation of video signals is shown.

DETAILED DESCRIPTION OF THE DRAWING

Referring to the FIGURE, automatic gain control (AGC) system 10 for detecting the peak white voltage level of a video signal for use in positive modulation schemes for video signals is shown. AGC system 10 includes intermediate frequency (IF) amplifier 12 having an input coupled to receive a positive modulated IF signal. An output of IF amplifier 12 is coupled to an input of demodulator 14 the output of which is coupled to an input of video amplifier 16.

The output of video amplifier 16, which provides a baseband TV video signal, is coupled to first inputs of gated amplifier 18 and peak detector 20. An output of gated amplifier 18 is coupled to a gain control input of IF amplifier 12. The output of gated amplifier 18 is also returned to ground via capacitor 22 wherein capacitor 22 is used to filter the output of gated amplifier 18.

A second input of peak detector 20 is coupled to receive reference voltage $V_{REFW}$ which is a reference peak white voltage level. An output of peak detector 20 is returned to ground via capacitor 24 wherein capacitor 24 is used to filter the output of peak detector 20. The output of peak detector 20 is also coupled to an input of buffer amplifier 26. The output of buffer amplifier 26 is coupled to a second input of gated amplifier 18. Further, the second input of gated amplifier 18 is coupled, via resistor 28, to receive reference voltage $V_{REFB}$ which is a reference black voltage level.

Also, gated amplifier 18 has an input coupled to terminal 30 for receiving a pulse signal for activating gated amplifier 18 when the pulse signal is in a first logic state.

The present invention provides an AGC system for accurately detecting the peak white voltage level while simultaneously tracking video signal fluctuations quickly.

Gated amplifier 18 is activated by a pulse signal which is applied at terminal 30 such that gated amplifier 18 is only active during the time period that the black voltage level exists. It is understood that the pulse signal applied to terminal 30 is generated internally in a well known manner with respect to video signals, for example, by using a sync separator and a one shot multivibrator, or a horizontal phase-locked loop, or a ramp generator and a comparator. If an inaccurate transmitter is utilized to transmit the modulated signal (as is the case in some countries such as France), then the black voltage level of the recovered video signal appearing at the output of video amplifier 16 may vary within a certain percentage, for example, up to plus-or-minus 12%. Moreover, the white voltage level correspondingly varies along with the black voltage level.

The present invention provides gated amplifier 18 which provides an output signal to a gain control of IF amplifier 12 thereby adjusting the gain of IF amplifier 12. This has the result of adjusting the black voltage level of the recovered video signal appearing at the first input of gated amplifier 18 to be substantially equal to the voltage appearing at the second input of gated amplifier 18. The voltage applied to the second input of gated amplifier 18 is initially set to be a black level reference voltage ($V_{REFB}$). The time constant to change the voltage at the output of gated amplifier 18 is determined by the value of capacitor 22 which can be chosen to yield a quick time constant because gated amplifier 18 samples (via the pulse signal) the black voltage level of a video signal on a line by line bases, for example, at a frequency of approximately 15.25 KHz.

The present invention also provides peak detector 20 which functions to modify the voltage appearing at circuit node 25 depending upon whether the voltage appearing at the first input of peak detector 20 is greater than or less than a peak white reference voltage ($V_{REFW}$). Thus, peak detector 20 is a peak white voltage level detector similar to one utilized in the prior art. However, the output of peak detector 20 does not drive the control input of IF amplifier 12 as is typically done in prior art (which resulted in a slow AGC system as aforedescribed). Rather, the output of peak detector 20 is used to modify the voltage appearing at the second input of gated amplifier 18 in response to various signal fluctuations appearing on the video signal. This has the effect of adjusting the reference voltage that appears at the second input of gated amplifier 18. Moreover, the value of capacitor 24 may be chosen such that a slow time constant exists with respect to peak detector 20 thereby allowing peak detector 20 to track very slow fluctuations of or errors in the peak white voltage level of the video signal. But, it is important to realize that since this slow tracking peak detector 20 does not directly drive the gain control input of IF amplifier 12, the slow time constant of peak detector 20 does not affect the overall speed of ACG system 10. Rather, it is the time constant associated with gated amplifier 18 that determines the overall speed of AGC system 10 because gated amplifier 10 directly drives the control input of IF amplifier 12 thereby allowing the system to track signal changes due to airplane flutter and changes of channel.

Thus, the present invention provides an AGC system that has two components responsive to a recovered video signal. The first component has a first time constant therewith which is a relatively quick time constant. The first component, which is activated during the time interval that the black voltage appears on the video signal, is responsive to an initial reference voltage to drive an IF amplifier to control the gain thereof. The second component has a second time constant associated therewith which is a relatively long time constant. The second component is used to detect the peak white voltage level of the video signal thereby adjusting the initial reference voltage to account for the variation in the peak white voltage level. This has the advantage of providing a fast AGC loop for recovered video signals from a positive modulation scheme while still detecting slow changes on the peak white voltage level of the video signal.

As an example, suppose that the peak white voltage level appearing at the output of video amplifier 16 is less than the reference white voltage level as applied at the second input of peak detector 20. This is probably a result of the fact that the black voltage level is inaccurate because it was transmitted from a transmitter that allows a range of adjustment in the black voltage level. In response to this video signal, gated amplifier 18 will act quickly when activated, via a pulse signal applied at terminal 30, and will quickly apply a voltage to the control input of IF amplifier 12 since capacitor 22 sets up a quick time constant. As a result, the peak white voltage level will be in error, but there will be no noticeable delay, for example, in obtaining a picture when one changes the channel. Moreover, the output of video amplifier 16 is also sent to peak detector 20 and because the actual peak white voltage level is less than the peak white reference voltage level, the voltage appearing at circuit node 25 will change at a time constant which is dependent upon the value of capacitor 24. This voltage appearing at circuit node 25 will be used to modify the reference voltage that is applied to the second input of gated amplifier 18 which will have the effect of changing the voltage to the control input of IF amplifier 12 such that the gain of IF amplifier 12 is increased as desired. Thus, a fast acting AGC loop for recovered video signals from a positive modulation scheme has been provided, while still having the capability of detecting and accounting for slow changes on the peak white voltage level of the video signal.

By now it should be apparent from the foregoing discussion that a novel automatic gain control (AGC) system for use in positive modulation schemes of video signals is provided. The AGC system includes an IF amplifier, a demodulator, a video amplifier, a gated amplifier and a peak detector. The gated amplifier has a first time constant therewith which is a relatively quick time constant. The first gated amplifier which is activated during the time interval that the black voltage appears on the video signal, is responsive to an initial reference voltage and the video signal and provides an output signal to control the gain of the IF amplifier. The peak detector has a second time constant associated therewith which is a relatively long time constant. The peak detector is used to detect the peak white voltage level of the video signal to adjust the initial reference voltage to account for fluctuations in the peak white voltage level. This has the advantage of providing a fast AGC loop for recovered video signals from a positive modulation scheme while still maintaining an accurate peak white voltage level of the video signal.

While the invention has been described in terms of particular arrangements and steps, these steps are for convenience of explanation and are not intended to be limiting and, as those skilled in the art will understand based on the description herein, the present invention applies to other choices, arrangements and steps, and it is intended to include in the claims it follows these and other variations as will occur to those skilled in the art based on the present disclosure.

I claim:

1. An automatic gain control system having an input coupled to receive a positive modulated TV IF signal, comprising:
    an intermediate frequency amplifier having an input, a gain control input and an output, said input of said intermediate frequency amplifier being coupled to receive the modulated TV IF signal;
    a demodulator having an input and an output, said input of said demodulator being coupled to said output of said intermediate frequency amplifier;
    a video amplifier having an input and an output, said input of said video amplifier being coupled to said output of said demodulator, said output of said video amplifier providing a recovered video signal;
    a gated amplifier having first and second inputs, a pulse input and an output, said first input of said gated amplifier being coupled to said output of said video amplifier, said second input of said gated amplifier being coupled to receive a first reference voltage, said pulse input of said gated amplifier being coupled to receive a pulse signal for activating said gated amplifier during a predetermined time interval, said output of said gated amplifier being coupled to said gain control input of said intermediate frequency amplifier; and a peak detector having first and second inputs and an output, said first input of said peak detector being coupled to said output of said video amplifier, said second input of said peak detector being coupled to receive a second reference voltage, said output of said peak detector being utilized to modify said first reference voltage applied to said second input of said gated amplifier, said gated amplifier having a first time constant associated therewith and said peak detector having a second time constant associated therewith, said second time constant being greater than said first time constant.

2. An automatic gain control system having an input coupled to receive a positive modulated TV IF signal, comprising:

an intermediate frequency amplifier having an input, a gain control input and an output, said input of said intermediate frequency amplifier being coupled to receive the modulated TV IF signal;

means for demodulating the modulated TV IF signal, said means having an input and an output, said input of said means being coupled to said output of said intermediate frequency amplifier, said output of said means providing a recovered video signal;

gated amplifier means responsive to said recovered video signal and a first reference voltage for providing an output signal to said gain control input of said intermediate frequency amplifier, said gated amplifier means having a first input coupled to said output of said means for demodulating, said gated amplifier means having an output coupled to said gain control input of said intermediate frequency amplifier, said gated amplifier means being rendered operative to sample a black level voltage of said recovered video signal; and peak detection means responsive to said recovered video signal and a second reference voltage for detecting a peak white voltage level appearing on said recovered video signal, said peak detection means having a first input coupled to said output of said means for demodulating, said peak detection means having an output for providing an output signal for modifying said first reference voltage of said gated amplifier means, said gated amplifier means having a first time constant associated therewith, and said peak detection means having a second time constant associated therewith, said second time constant being greater than said first time constant.

3. The automatic gain control system according to claim 2 wherein said means for demodulating includes:

a demodulator having an input and an output, said input of said demodulator being coupled to said output, of said intermediate frequency amplifier; and a video amplifier having an input and an output, said input of said video amplifier being coupled to said output of said demodulator, said output of said video amplifier providing said recovered video signal.

4. A method for providing an automatic gain control system for video signals using positive modulation schemes, the automatic gain control system including an intermediate frequency amplifier which is responsive to a modulated TV IF signal and a demodulator for providing a recovered video signal, the method comprising the steps of:

(a) comparing a black level voltage of the recovered video signal with an initial reference voltage;

(b) adjusting within a first time period, a gain of the intermediate frequency amplifier in response to a result obtained from step (a);

(c) detecting the peak white voltage level of the recovered video signal;

(d) modifying, within a second time period, said initial reference voltage in response to a result obtained from step (c).

* * * * *